United States Patent
Golander et al.

(10) Patent No.: US 10,254,990 B2
(45) Date of Patent: Apr. 9, 2019

(54) DIRECT ACCESS TO DE-DUPLICATED DATA UNITS IN MEMORY-BASED FILE SYSTEMS

(71) Applicant: NETAPP, INC., Sunnyvale, CA (US)

(72) Inventors: Amit Golander, Tel Aviv (IL); Yigal Korman, Hertzliya (IL); Boaz Harrosh, Hertzliya (IL)

(73) Assignee: NETAPP, INC., Sunnyvale, CA (US)

( * ) Notice: Subject to any disclaimer, the term of this patent is extended or adjusted under 35 U.S.C. 154(b) by 0 days.

(21) Appl. No.: 15/154,605

(22) Filed: May 13, 2016

(65) Prior Publication Data

US 2017/0160979 A1 Jun. 8, 2017

Related U.S. Application Data

(60) Provisional application No. 62/263,936, filed on Dec. 7, 2015.

(51) Int. Cl.
| | |
|---|---|
| *G06F 3/06* | (2006.01) |
| *G06F 12/02* | (2006.01) |
| *G06F 12/06* | (2006.01) |
| *G06F 12/14* | (2006.01) |

(Continued)

(52) U.S. Cl.
CPC ............ *G06F 3/0641* (2013.01); *G06F 3/065* (2013.01); *G06F 3/0608* (2013.01); *G06F 3/068* (2013.01); *G06F 3/0619* (2013.01); *G06F 12/0292* (2013.01); *G06F 12/063* (2013.01); *G06F 12/1009* (2013.01); *G06F 12/1475* (2013.01);

(Continued)

(58) Field of Classification Search
None
See application file for complete search history.

(56) References Cited

U.S. PATENT DOCUMENTS

| 9,678,670 B2 | 6/2017 | Golander et al. |
| 9,851,919 B2 | 12/2017 | Golander et al. |
| 9,936,017 B2 | 4/2018 | Golander et al. |

(Continued)

OTHER PUBLICATIONS

Philipp Kern. Generalizing Memory Deduplication for Native Applications, Sandboxes and Virtual Machines. Diploma Thesis. System Architecture Group, Karlsruhe Institute of Technology (KIT) Germany [online], Apr. 30, 2013 [retrieved on Aug. 30, 2017]. Retrieved from the Internet:< URL:http://os.itec.kit.edu/2652_2644.php>.*

(Continued)

*Primary Examiner* — Edward J Dudek, Jr.
*Assistant Examiner* — Ralph A Verderamo, III
(74) *Attorney, Agent, or Firm* — Klein, O'Neill & Singh, LLP

(57) ABSTRACT

Method, system and product for direct access to de-duplicated data units in memory-based file systems. The method comprising: updating a page entry in a page table of a process to include a direct access pointer to a de-duplicated data unit retained by the memory-based file system, wherein the page entry is set to be write protected; detecting a page fault occurring due to the process performing a store instruction to the de-duplicated data unit; and in response to said detecting: allocating a new data unit; copying content of the de-duplicated data unit to the new data unit; and replacing the direct access pointer to the de-duplicated data unit with a direct access pointer to the new data unit.

20 Claims, 3 Drawing Sheets

(51) Int. Cl.
*G06F 12/0866* (2016.01)
*G06F 12/1009* (2016.01)

(52) U.S. Cl.
CPC .. *G06F 12/0866* (2013.01); *G06F 2212/1032* (2013.01); *G06F 2212/1052* (2013.01)

(56) References Cited

U.S. PATENT DOCUMENTS

| | | | | |
|---|---|---|---|---|
| 2009/0204650 | A1* | 8/2009 | Wong | G06F 17/30153 |
| 2012/0159081 | A1* | 6/2012 | Agrawal | G06F 12/0866 711/141 |
| 2014/0281118 | A1* | 9/2014 | Hepkin | G06F 9/45533 711/6 |
| 2017/0090816 | A1* | 3/2017 | Tsirkin | G06F 3/0604 |

OTHER PUBLICATIONS

Carl A. Waldspurger. Memory resource management in VMware ESX server. SIGOPS Oper. Syst. Rev. 36, SI (Dec. 2002), 181-194. [online] [retrieved on Aug. 30, 2017] Retrieved from the Internet:<URL:http://dx.doi.org/10.1145/844128.844146>.*

Derek G. Murray, Steven Hand and Michael A. Fetterman. Satori: Enlightened Page Sharing. In Proceedings of the USENIX Annual Technical Conference. [online] 2009 [retrieved on Aug. 30, 2017]. Retrieved from the Internet:<URL:https://www.usenix.org/legacy/event/usenix09/tech/full_papers/milos/milos_html/>.*

Diwaker Gupta, Sangmin Lee, Michael Vrable, Stefan Savage, Alex C. Snoeren, George Varghese, Geoffrey M. Voelker, and Amin Vahdat. Difference engine: harnessing memory redundancy in virtual machines. Commun. ACM 53, 10 (Oct. 2010), 85-93. [online] [retrieved on Aug. 30, 2017] Retrieved from the Internet:<URL:https://doi.org/10.1145/1831407.1831429>.*

Edouard Bugnion, Scott Devine, and Mendel Rosenblum. Disco: running commodity operating systems on scalable multiprocessors. In Proceedings of the sixteenth ACM symposium on Operating systems principles (SOSP '97) [online], 1997 [retrieved on Aug. 30, 2017]. Retrieved from the Internet:<URL:http://dx.doi.org/10.1145/268998.266672>.*

Subramanya R. Dulloor, Sanjay Kumar, Anil Keshavamurthy, Philip Lantz, Dheeraj Reddy, Rajesh Sankaran, and Jeff Jackson. 2014. System software for persistent memory. In Proceedings of the Ninth European Conference on Computer Systems (EuroSys '14). ACM, New York, NY, USA, Article 15, 15 pages. (Year: 2014).*

Xiaojian Wu and A. L. Narasimha Reddy. 2011. SCMFS: a file system for storage class memory. In Proceedings of 2011 International Conference for High Performance Computing, Networking, Storage and Analysis (SC '11). ACM, New York, NY, USA, Article 39, 11 pages. (Year: 2011).*

Condit et al.; "Better I/O Through Byte-Addressable, Persistent Memory"; SOSP '09; Oct. 11-14, 2009; Big Sky, Montana, US; 14 pages.

* cited by examiner

DIRECT ACCESS TO DE-DUPLICATED DATA UNITS IN MEMORY-BASED FILE SYSTEMS

CROSS-REFERENCE TO RELATED APPLICATION

This application claims the benefit of U.S. Provisional Application No. 62/263,936 filed Dec. 7, 2015, entitled "A method for providing direct access to de-duplicated pages in a memory-based file system", which is hereby incorporated by reference in its entirety without giving rise to disavowment.

TECHNICAL FIELD

The present disclosure relates to a memory based file systems in general, and to a memory-based filed system that support de-duplicated data units, in particular.

BACKGROUND

Some file systems are known to support de-duplicated data. A single data unit (e.g., data block) is retained and used to represent different portions of a same file or of a different file. As one example, a zero data unit, comprising only zeros, is used repeatedly in different locations of a file thereby reducing required storage space.

In some cases, de-duplication is performed by construction or as a pro-active step by the user. As an example, de-duplication by construction may include data snapshots and explicit user commands such as "cp-reflink", in which the user explicitly requests to copy/clone/duplicate content. As another example, the proactive approach may require traversing the data, scanning it for duplicated values and eliminating them or avoiding building duplicated copies on persistent storage.

In traditional file systems, all accesses to de-duplicated data units are performed via the file system. The file system is responsible to perform a Copy-on-Write (CoW) in case a write access is performed.

File storage is traditionally implemented as non-volatile storage media such as magnetic hard-disk drive (HDD) or Flash-based solid-state drive (SSD), and employed as a peripheral device to one or more computing devices. Such technologies provide affordable capacity, but at latency longer in many orders of magnitudes as compared to the latency of volatile memory such as dynamic random-access memory (DRAM).

Newly developed storage media technologies are currently becoming available, which overcome this problem. Such a persistent memory device for example, a Non-Volatile Dual In-line Memory Module (NVDIMM) is a computer random access memory (RAM) that retains data even when electrical power is stopped due to normal system shutdown, an unexpected power loss, system crash or any other reason. Currently the main types of available and announced NVDIMM cards include: NVDIMM-N which is a byte-addressable memory-mapped device, NVDIMM-P which is a super set of NVDIMM-N, and new storage class memory (SCM) based NVDIMMs, built from for example 3D XPoint, MRAM and other byte addressable technologies. These devices are typically accessed at memory or near-memory speeds.

Thanks to emerging persistent memory technologies, memory-based file systems are now available. Some memory-based file systems may use NVDIMMs, or other persistent memory devices. However, some memory-based file systems may use non-persistent memory devices. Memory-based file systems may enable direct access (DAX) by computer programs with memory-mapped I/O directly to the storage media, without requiring to access a software cache memory or without any intervention of the file system itself within the data path.

BRIEF SUMMARY

One exemplary embodiment of the disclosed subject matter is a computer-implemented method performed in a computerized system having a memory-based file system, the method comprising: updating a page entry in a page table of a process to include a direct access pointer to a de-duplicated data unit retained by the memory-based file system, wherein the page entry is set to be write protected; detecting a page fault occurring due to the process performing a store instruction to the de-duplicated data unit; and in response to said detecting: allocating a new data unit; copying content of the de-duplicated data unit to the new data unit; and replacing the direct access pointer to the de-duplicated data unit with a direct access pointer to the new data unit.

Another exemplary embodiment of the disclosed subject matter is a computer program product comprising a non-transient computer readable storage medium retaining program instructions, which program instructions when read by a processor, cause the processor to perform a method comprising: updating a page entry in a page table of a process to include a direct access pointer to a de-duplicated data unit retained by a memory-based file system, wherein the page entry is set to be write protected; detecting a page fault occurring due to the process performing a store instruction to the de-duplicated data unit; and in response to said detecting: allocating a new data unit; copying content of the de-duplicated data unit to the new data unit; and replacing the direct access pointer to the de-duplicated data unit with a direct access pointer to the new data unit.

Yet another exemplary embodiment of the disclosed subject matter is an apparatus comprising a processor and memory, wherein the memory retaining a memory-based file system, wherein said processor is configured to perform a method comprising: updating a page entry in a page table of a process to include a direct access pointer to a de-duplicated data unit retained by a memory-based file system, wherein the page entry is set to be write protected; detecting a page fault occurring due to the process performing a store instruction to the de-duplicated data unit; and in response to said detecting: allocating a new data unit; copying content of the de-duplicated data unit to the new data unit; and replacing the direct access pointer to the de-duplicated data unit with a direct access pointer to the new data unit.

THE BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

Figure 1A:
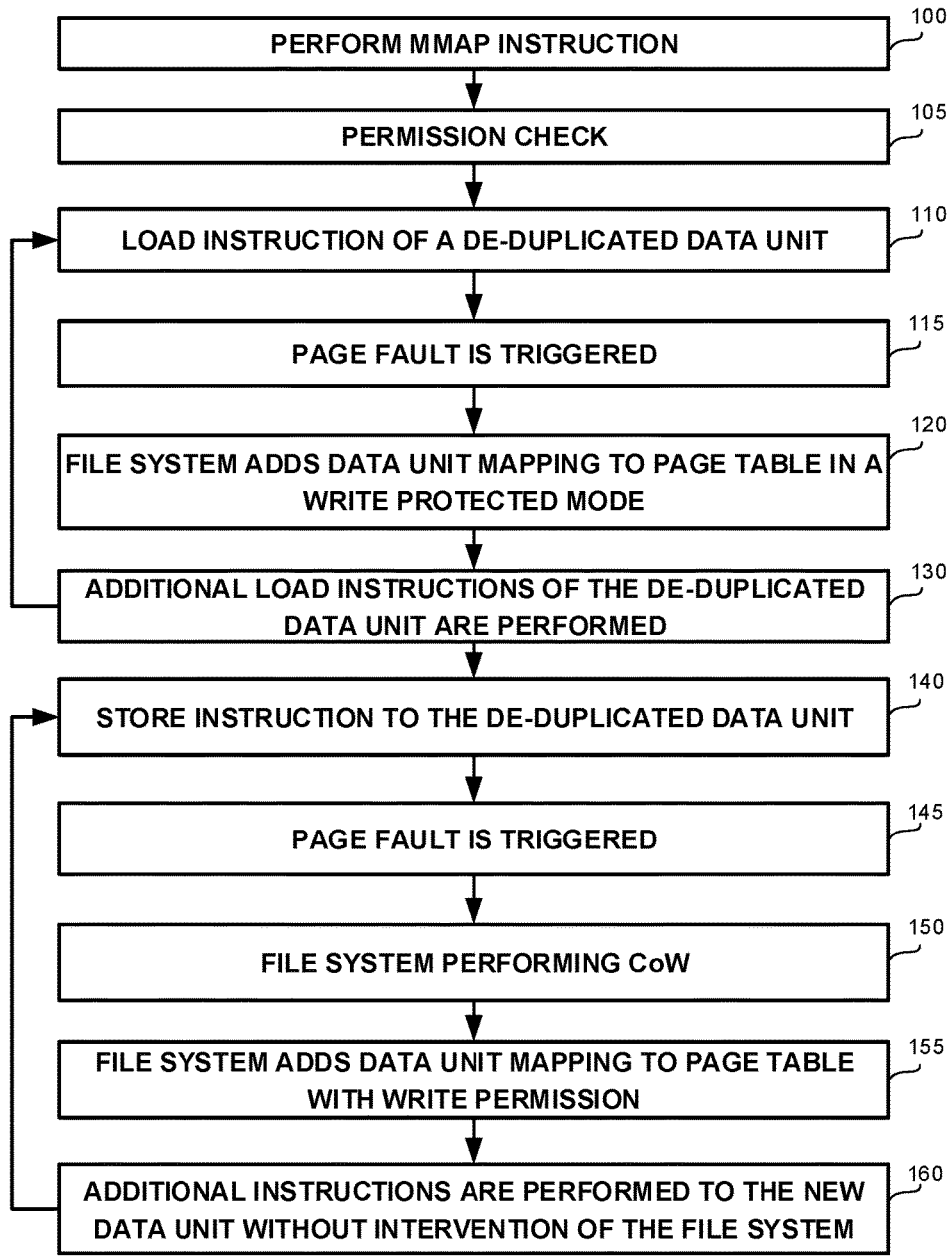
FIG. 1A shows a flowchart of steps in a method, in accordance with some exemplary embodiments of the subject matter.

One technical problem relates to providing memory-based file system having de-duplication capabilities while allowing direct access capabilities.

While a naïve solution may be to prevent direct access capabilities to de-duplicated data units, such a solution is sub-optimal and decreases the potential performance improvement offered by memory-based file systems. In such a solution, a volatile cache copy of the de-duplicated data unit is created in the page cache, and the computer program accesses such page cache and not the copy in the file system. The file system may synchronize the data from the cache system at certain times (e.g., periodically, at file close, in response to a system call or function invocation) and upon synchronizing, CoW is performed, where de-duplicated data unit is modified.

Direct access to the memory used to retain the data units of the memory-based file system may be transparent to the file system and thus data integrity can be broken for de-duplicated data units.

It may be desired to provide for a memory-based file system that supports direct access to de-duplicated data units. As an example, the mmap instruction (memory map) maps portions of a file system to memory and provides a virtual address space to be used to access the mapped portion directly, such as using load/store instructions that operate on memory addresses. Post the mmap instruction, load/store instructions may be used to access the memory directly without going through the file system interface, e.g., POSIX system calls. Direct accesses to mmaped data units may bypass the page cache used with non-memory-based file systems, and accordingly may improves latency, and the resource utilization, such as utilization of DRAM capacity and CPU resources.

One technical solution may be to utilize permissions capabilities to allow the file system to intervene when a de-duplicated data unit is being accessed to be modified. A de-duplicated data unit may be loaded to the page table of the process and the page entry may be indicated as write protected. Accordingly, the page entry may be accessed using load instructions. The application virtual address used to access the page entry may be translated to a direct access pointer to the de-duplicated data unit which is retained by the memory-based file system. If a store instruction, or other instruction which requires write permission is attempted to be performed on the page entry, a page fault is triggered due to the page being write protected. The page fault provides the file system an opportunity to allocate a new data unit having the de-duplicated data (e.g., perform CoW). An address to the new data unit may be returned and manipulation thereof does not affect data integrity of the memory-based file system.

In some exemplary embodiments, the page table may be a data structure to store mapping between virtual addresses and physical addresses. In some exemplary embodiments, the virtual addresses may be used by the accessing process, while physical addresses may indicate the location in the memory hardware device. In some exemplary embodiments, a page entry in the page table may be used to provide an address to a data unit, also referred to as a page.

One technical effect of utilizing the disclosed subject matter is the ability to provide space-efficient file system which utilize de-duplication mechanisms, without waiving the performance improvements offered by the direct access capabilities of the memory-based file systems.

Referring now to FIG. 1A, showing a flowchart of steps in a method, in accordance with some exemplary embodiments of the subject matter.

On Step 100, an mmap instruction is performed by a process. The mmap instruction instructs the file system to map at least one data unit of a file retained in a memory-based file system to memory, so as to allow direct access to the data unit. As an example, the process may issue an mmap system call to the first 1 GB of a file. The file may be a file that was created by writing 4 KB of data to an offset of 2 GB, hence the first 2 GB of the file may be assumed to hold the values of zeros, if read.

It will be noted that the disclosed subject matter is not limited to mmap instruction, and such specific POSIX-compliant UNIX™ system call is provided as an illustrative example only.

On Step 105, permissions are checked to validate that the process has permissions allowing it to perform memory mapping.

On Step 110, the process may issue a load instruction to a data unit in the mmaped memory range (e.g., the 1 GB which was subject to the mmap instruction of Step 100). The term "load instruction" may comprise any instruction which requires read-only access to addressable memory.

On Step 115, a page fault is triggered as the accessed page is not in the page table.

On Step 120, the file system handles the page fault. The file system updates the page table to provide the address of a data unit, which may be a de-duplicated data unit. In some exemplary embodiments, the page entry in the page table may be set as "write protected". In some exemplary embodiments, the page entry is set as write protected regardless of actual permissions and irrespective of the process having permission to write to the relevant data unit. In some exemplary embodiments, the de-duplicated data unit may be file-specific (e.g., a zero data unit is allocated per file). Additionally or alternatively, the de-duplicated data unit may be generic for the file system and used for all files. In the present example, in which 1 GB holding only zeros is mmapped, the de-duplicated data unit may be a zero data unit.

On Step 130, additional load instructions may be performed to read the content of the loaded page in a direct manner, without making use of a cache mechanism and by directly accessing the addressable space of the memory-based file system. In some exemplary embodiments, the additional load instructions may be performed in a manner that is transparent to the file system which may be unaware of the process performing such read accesses directly to the loaded page. In the present example, in which 1 GB holding only zeros, is mmapped, the content may be zeros.

In some exemplary embodiments, Steps 110-130 may be repeated for additional data units in the mmaped range. As an example, a total number of M different pages may be accessed.

On Step 140, the process may issue a store instruction to the previously loaded data unit. The term "store instruction"

may comprise any instruction which requires write access to addressable memory and potentially modifies the content of the accessed memory.

On Step 145, as the accessed page is indicated as write protected, a page fault is triggered.

On Step 150, the file system handles the page fault. The file system may determine that the accessed data unit is a de-duplicated data unit, such as by determining whether a reference count to the data unit is larger than one, and perform a CoW. The file system may allocate a new data unit, copy the content of the accessed, de-duplicated data unit, to the newly allocated data unit, and return a pointer to the newly allocated data unit instead of the de-duplicated data unit.

In some exemplary embodiments, CoW may be performed only if needed. As an example, in case a reference counter is used to count a number of uses of a data unit, CoW may be required in case the reference counter is larger than one, as such count may be indicative of the data block being actually used as a de-duplicated data unit. In some exemplary embodiments, the reference count may change during operation of the file system. As an example, upon performing CoW, a reference count of the original de-duplicated data unit may be reduced by one.

On Step 155, the page table may be updated accordingly, and the permissions are updated to indicate that the newly allocated data unit can be updated (i.e., not "write protected"). In some exemplary embodiments, the file system may add to the page table a mapping to the new data unit, and set such page entry to be write enabled. Providing write permissions to the page entry may enable performing store instructions without intervention and awareness of the file system to the new data unit, which is not a de-duplicated data unit.

In some exemplary embodiments, Steps 140-155 may be performed for additional de-duplicated data units. As an example, a total number of K (K<<M) different pages may be written to.

In some exemplary embodiments, a total number of K+1 data units may be allocated, instead of at least M data units, which would have been allocated in file systems which do not support de-duplication. As M may be assumed to be generally much larger than K, such a reduction may be substantial.

On Step 160 additional instructions (e.g., load instructions or store instructions) may be performed to newly allocated data units. Each such load instruction is handled without any intervention by the file system, through direct access to the newly allocated data units.

It will be noted that the disclosed subject matter is presented with respect to an embodiment which performs lazy, on-demand, allocation of data units. However, the disclosed subject matter is not limited to such embodiment and may be implementable in a non-lazy embodiment, such as an embodiment which updates the page table upon performing the mmap instruction and not only upon accessing each such page. In such an embodiment, the mmap instruction may trigger updating of the page table to reflect all entries of the mapped range and for each entry which is associated with a de-duplicated data unit, the page entry may be set as write protected.

Figure 1B:
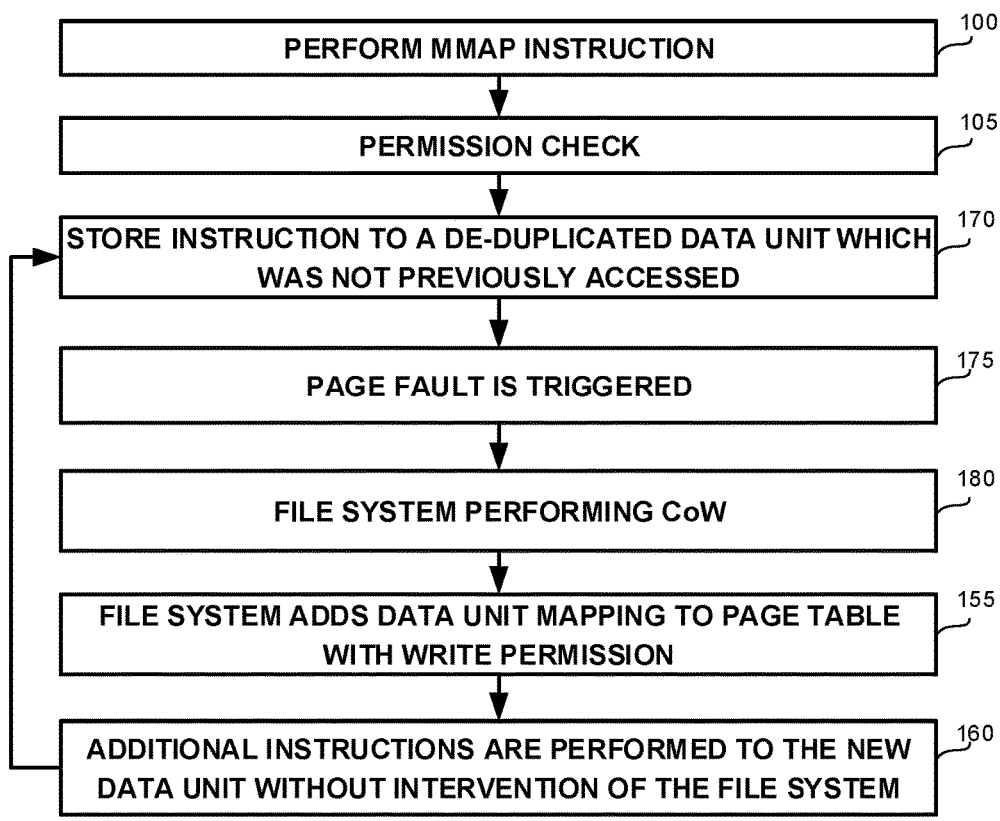
FIG. 1B shows a flowchart of steps in a method, in accordance with some exemplary embodiments of the subject matter.

Referring now to FIG. 1B, showing a flowchart of steps in a method, in accordance with some exemplary embodiments of the subject matter. FIG. 1B shows a method performed in a lazy implementation in which a store instruction is performed to a data unit which was not previously accessed using a load instruction.

On Step 170, a store instruction is performed to a data unit in the mapped range, which was not previously accessed.

On Step 175, a page fault is triggered as no corresponding page is found in the page table of the process.

On Step 180, the page fault is handled by the file system. The file system may determine that the accessed data unit is a de-duplicated data unit, e.g., by checking whether the reference count of the data unit is larger than one. Accordingly, a Copy on Write may be performed and a new data unit may be allocated by the file system. After CoW is performed, Step 155 may be performed and the file system may update the page table to allow the process to perform direct access to the new data unit. The page entry may be indicated as having write permission thereby allowing the process to modify the content of the new data unit in a direct manner.

Figure 2:
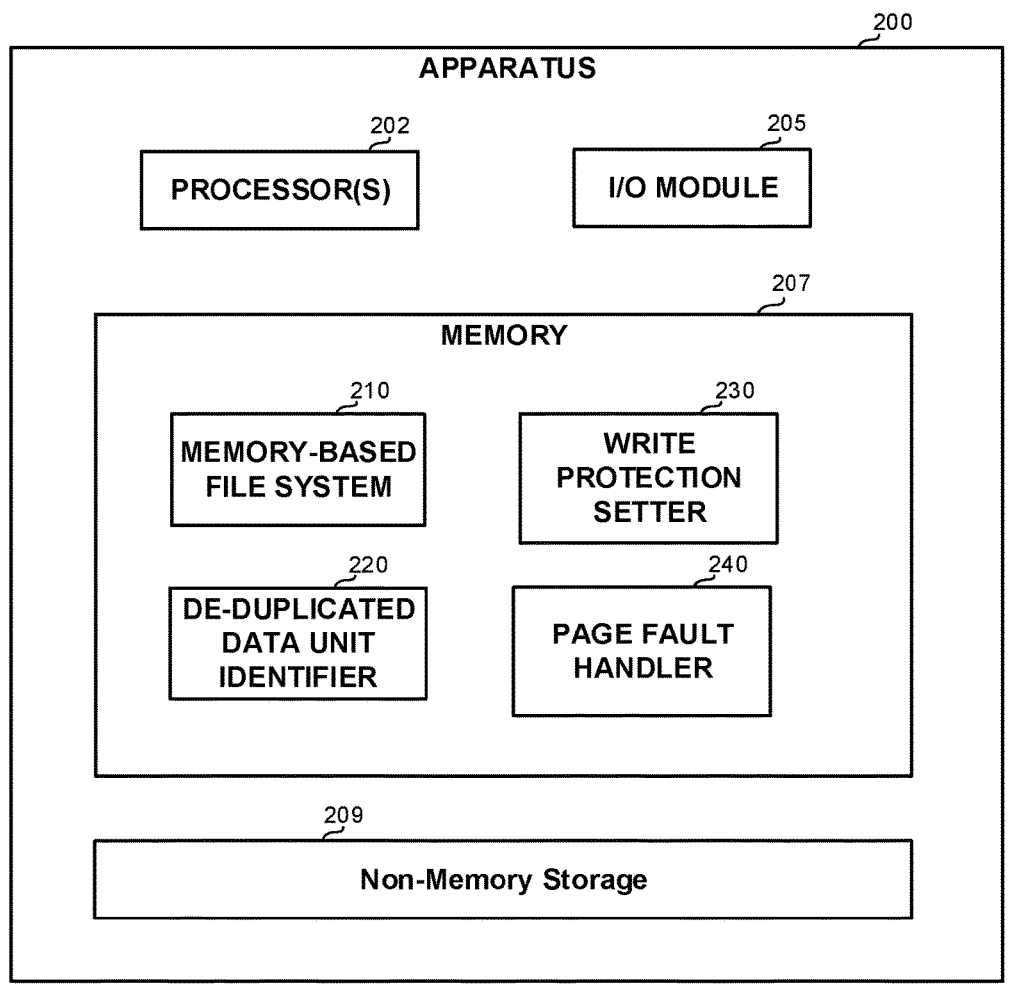
FIG. 2 shows an apparatus in accordance with some exemplary embodiments of the disclosed subject matter.

Referring now to FIG. 2 showing an apparatus in accordance with some exemplary embodiments of the disclosed subject matter. An Apparatus 200 may be configured to perform any of the methods of FIGS. 1A-1B or the like.

In some exemplary embodiments, Apparatus 200 may comprise a Processor 202. Processor 202 may be a Central Processing Unit (CPU), a microprocessor, an electronic circuit, an Integrated Circuit (IC) or the like. Processor 202 may be utilized to perform computations required by Apparatus 200 or any of it subcomponents.

In some exemplary embodiments of the disclosed subject matter, Apparatus 200 may comprise an Input/Output (I/O) Module 205. The I/O Module 205 may be utilized to provide an output to and receive input from a user. It will be understood, that Apparatus 200 may be configured to operate without user input or human interaction.

In some exemplary embodiments, Apparatus 200 may comprise Memory 207. Memory 207 may be an addressable memory, such as persistent or volatile memory. In some exemplary embodiments, Memory 207 may retain program code operative to cause Processor 202 to perform acts associated with any of the subcomponents of Apparatus 200. In some exemplary embodiments, Non-Memory Storage 209 may provide for persistent storage that is not memory-based, such as a hard disk, a flash drive, or the like. In some exemplary embodiments, a memory-based file system may retain at least a portion of the data units in Memory 207, while potentially retaining some portions of the data units on Non-Memory Storage 209. It will be noted that Memory 207 is illustrated schematically and in some embodiments different memories may exist, such as Random Access Memory (RAM), Cache, Persistent Memory, or the like.

In some exemplary embodiments, Memory 207 may retain Memory-Based File System 210, which may comprise both functional aspects of the file system (e.g., executable code and instructions for Processor 202) and data storage of the file system (e.g., data units of the content of the file system). In some exemplary embodiments, Memory-Based File System 210 may indicate that some of the data units are retained in Non-Memory Storage 209, as may be the case when Memory 207 functions as a first layer of the storage.

Page Fault Handler 240 may be configured to handle a page fault resulting from either an accessed mapped data unit not being loaded to memory (e.g., no relevant page entry exists) or in response to an attempt to perform write access on a write protected page. Page Fault Handler 240 may be configured to perform CoW when attempting to write to a de-duplicated data unit. The data unit may be identified as de-duplicated by De-Duplicated Data Unit Identifier 220. Additionally or alternatively, Page Fault Handler 240 may be configured to load a new data unit from the file system to the page table and provide for direct access thereto. In case the loaded data unit is a de-duplicated data unit, which may be ascertained using De-Duplicated Data Unit Identifier 220, Page Fault Handler 240 may invoke Write Protection Setter 230 to set the page entry of the loaded data unit to be write protected thereby preventing modification via direct access of the de-duplicated data unit without the file system being able to intervene and preserve data consistency.

De-Duplicated Data Unit Identifier 220 may be configured to identify whether a data unit in Memory-Based File System 210 is a de-duplicated data unit. In some exemplary embodiments, the file system may indicate de-duplicated data units using a predetermined parameter or identifier, may utilize a pointer counter where a counter value above 1 indicates the data unit is being used in more than a single place, or the like.

Write Protection Setter 230 may be configured to set a page entry in a page table as write protected. In some exemplary embodiments, Write Protection Setter 230 may be invoked by Memory-Based File System 210 in response to De-Duplicated Data Unit Identifier 220 identifying that a loaded page that is being accessed by a read access, is a de-duplicated data unit.

In some exemplary embodiments, the disclosed subject matter may be utilized with respect to a zero data unit or other thinly provisioned resource in the file system. In some exemplary embodiments, the thinly provisioned resource may be a resource that is referred to logically in the file system in plurality of places without duplicating the resource. In some exemplary embodiments, the thinly provisioned resource may not be allocated but only referred to logically. As an example, a zero data unit identifier may be used to indicate that a data block holds only zeros. However, the file system may avoid allocating a data unit and filling it with zeros. Instead, the fact that a zero data unit identifier is referred to may indicate that if accessed, all bits are zeroed in the data unit. In some exemplary embodiments, the zero data unit may be allocated upon first usage within a file, within the file system, or within a predetermined scope. Additionally or alternatively, the zero data unit may be allocated only upon being accessed to write (e.g., when CoW is logically performed). In some exemplary embodiments, the zero data unit may be allocated at such time at the storage layer. Additionally or alternatively, the zero data unit may be allocated when the zero data unit is loaded into the page cache. In such a case, the zero data unit may be allocated upon being loaded for write access only or for read access as well.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method comprising:
mapping a data unit of a file to a memory address of a process at a memory for direct access to the data unit by the process, bypassing use of a page cache of a memory-based file system retained in the memory with the data unit;
updating a page table by the file system, in response to a load instruction to read the data unit and a first page fault triggered by the load instruction, with a page entry for the data unit detected as a de-duplicated data unit, the page entry set as write protected, regardless of a permission type for the process, and the page entry having a pointer to directly read the data unit by the process for any additional load instructions transparent to the file system bypassing the page cache;
detecting a second page fault due to a first store instruction for the de-duplicated data unit by the process; and
setting the page entry as write enabled for performing a second store instruction by the process using a new pointer to a new data unit with copied content of the de-duplicated data unit, bypassing the page cache.

2. The method of claim 1, wherein the memory for retaining the file system and the data unit is a persistent memory.

3. The method of claim 1, wherein the page table is updated when the load instruction is issued for a first time for the de-duplicated unit.

4. The method of claim 1, wherein setting the page entry as write enabled is performed in response to detecting that the data unit is the de-duplicated data unit.

5. The method of claim 1, wherein the de-duplicated data unit is a zeros data unit.

6. The method of claim 1, wherein setting the page entry enables additional load instructions by the process, bypassing the page cache.

7. The method of claim 1, wherein updating the page table is performed in response to a memory mapping instruction for mapping the data unit.

8. A non-transitory, machine readable medium having stored thereon instructions comprising machine executable code which when executed by a machine, causes the machine to:
map a data unit of a file to a memory address of a process at a memory for direct access to the data unit by the process, bypassing use of a page cache of a memory-based file system retained in the memory with the data unit;
update a page table by the file system, in response to a load instruction to read the data unit and a first page fault triggered by the load instruction, with a page entry for the data unit detected as a de-duplicated data unit, the page entry set as write protected, regardless of a permission type for the process, and the page entry having a pointer to directly read the data unit by the process for any additional load instructions transparent to the file system bypassing the page cache;
detect a second page fault due to a first store instruction for the de-duplicated data unit by the process; and
set the page entry as write enabled for performing a second store instruction by the process using a new pointer to a new data unit with copied content of the de-duplicated data unit, bypassing the page cache.

9. The non-transitory storage medium of claim 8, wherein the memory for retaining the file system and the data unit is a persistent memory.

10. The non-transitory storage medium of claim 8, wherein the page table is updated when the load instruction is issued for a first time for the de-duplicated unit.

11. The non-transitory storage medium of claim 8, wherein setting the page entry as write enabled is performed in response to detecting that the data unit is the de-duplicated data unit.

12. The non-transitory storage medium of claim 8, wherein the de-duplicated data unit is a zeros data unit.

13. The non-transitory storage medium of claim 8, wherein setting the page entry enables additional load instructions by the process, bypassing the page cache.

14. The non-transitory storage medium of claim 8, wherein updating the page table is performed in response to a memory mapping instruction for mapping the data unit.

15. A system, comprising:
a memory containing machine readable medium comprising machine executable code having stored thereon instructions; and a processor coupled to the memory, the processor configured to execute the machine executable code to:
map a data unit of a file to a memory address of a process at a memory for direct access to the data unit by the process, bypassing use of a page cache of a memory-based file system retained in the memory with the data unit;
update a page table by the file system, in response to a load instruction to read the data unit and a first page fault triggered by the load instruction, with a page entry for the data unit detected as a de-duplicated data unit, the page entry set as write protected, regardless of a permission type for the process, and the page entry having a pointer to directly read the data unit by the process for any additional load instructions transparent to the file system, bypassing the page cache;
detect a second page fault due to a first store instruction for the de-duplicated data unit by the process; and
set the page entry as write enabled for performing a second store instruction by the process using a new pointer to a new data unit with copied content of the de-duplicated data unit, bypassing the page cache.

16. The system of claim 15, wherein the memory for retaining the file system and the data unit is a persistent memory.

17. The system of claim 15, wherein the page table is updated when the load instruction is issued for a first time for the de-duplicated unit.

18. The system of claim 15, wherein setting the page entry as write enabled is performed in response to detecting that the data unit is the de-duplicated data unit.

19. The system of claim 15, wherein the de-duplicated data unit is a zeros data unit.

20. The system of claim 15, wherein setting the page entry enables additional load instructions by the process, bypassing the page cache.

* * * * *